(12) United States Patent
Hirai et al.

(10) Patent No.: US 7,776,453 B2
(45) Date of Patent: Aug. 17, 2010

(54) MACHINE ELEMENT AND METHOD FOR MANUFACTURING THEREOF

(75) Inventors: Isao Hirai, Iwata (JP); Takayasu Takubo, Iwata (JP); Kazuhiko Yoshida, Iwata (JP)

(73) Assignee: NTN Corporation, Osaka (JP)

( * ) Notice: Subject to any disclaimer, the term of this patent is extended or adjusted under 35 U.S.C. 154(b) by 556 days.

(21) Appl. No.: 10/592,112

(22) PCT Filed: Mar. 3, 2005

(86) PCT No.: PCT/JP2005/003576
§ 371 (c)(1),
(2), (4) Date: Sep. 8, 2006

(87) PCT Pub. No.: WO2005/088147
PCT Pub. Date: Sep. 22, 2005

(65) Prior Publication Data
US 2007/0187004 A1    Aug. 16, 2007

(30) Foreign Application Priority Data
Mar. 10, 2004  (JP) .............................. 2004-067418

(51) Int. Cl.
*B32B 15/18* (2006.01)
*F16C 13/02* (2006.01)
(52) U.S. Cl. ...................... 428/684; 428/687; 384/544; 384/625; 29/898.06
(58) Field of Classification Search ...................... None
See application file for complete search history.

(56) References Cited

U.S. PATENT DOCUMENTS

| | | | | |
|---|---|---|---|---|
| 4,930,909 A | | 6/1990 | Murakami et al. | |
| 5,803,993 A | * | 9/1998 | Yoshida et al. | 148/320 |
| 6,063,218 A | | 5/2000 | Muraoka et al. | |
| 6,280,096 B1 | | 8/2001 | Miyazaki et al. | |
| 6,390,924 B1 | * | 5/2002 | Yoshida et al. | 464/111 |
| 6,673,167 B2 | * | 1/2004 | Yoshida et al. | 148/328 |
| 2002/0185201 A1 | * | 12/2002 | Kitano | 148/567 |

(Continued)

FOREIGN PATENT DOCUMENTS

DE    10323447    1/2004

(Continued)

OTHER PUBLICATIONS

European Search Report issued in European Patent Application No. EP 05719880.6-2424/1731777 PCT/JP2005003576, dated Mar. 13, 2009.

(Continued)

*Primary Examiner*—Jennifer C McNeil
*Assistant Examiner*—Jason L Savage
(74) *Attorney, Agent, or Firm*—McDermott Will & Emery LLP

(57) ABSTRACT

A hub ring and/or an outer ring constituting a bearing device for a wheel, which is formed of a steel which contains 0.45 to 0.70 mass % of C and at least one of V, Nb and Ti in a total amount of 0.3 mass % or less, wherein a micro structure of a part being not surface-hardening-treated contains a ferrite in 15 to 30 area % and contains a particulate ferrite.

7 Claims, 12 Drawing Sheets

U.S. PATENT DOCUMENTS

| | | |
|---|---|---|
| 2003/0123769 A1 | 7/2003 | Ohki |
| 2004/0226631 A1* | 11/2004 | Kitano ................ 148/320 |
| 2004/0252926 A1 | 12/2004 | Tajima |
| 2005/0141799 A1* | 6/2005 | Uyama et al. ............ 384/544 |
| 2005/0205171 A1* | 9/2005 | Nakamyou ............... 148/337 |
| 2007/0227634 A1* | 10/2007 | Perrot-Simonetta et al. . 148/595 |

FOREIGN PATENT DOCUMENTS

| | | |
|---|---|---|
| EP | 1 541 377 A1 | 6/2005 |
| JP | 2-125841 A | 5/1990 |
| JP | 6-57324 A | 3/1994 |
| JP | 6-279854 | 10/1994 |
| JP | 11-129703 A | 5/1999 |
| JP | 11-269553 A | 10/1999 |
| JP | 2000-336460 | 12/2000 |
| JP | 2002-226938 A | 8/2002 |
| JP | 2002-275584 A | 9/2002 |
| JP | 2002-332535 A | 11/2002 |
| JP | 2003-193139 A | 7/2003 |
| JP | 2003-226919 A | 8/2003 |
| JP | 2003-277878 A | 10/2003 |
| WO | WO 2004/007219 A1 | 1/2004 |

OTHER PUBLICATIONS

Japanese Office Action, with English translation, issued in Japanese Patent Application No. 2004-067418, dated Sep. 29, 2009.

* cited by examiner

EXAMPLE 1 OF INVENTION

EXAMPLE 2 OF INVENTION

EXAMPLE 3 OF INVENTION

EXAMPLE 4 OF INVENTION

COMPARATIVE EXAMPLE 1

COMPARATIVE EXAMPLE 2

COMPARATIVE EXAMPLE 3

Si OF 0.22 MASS %

Si OF 0.5 MASS %

MACHINE ELEMENT AND METHOD FOR MANUFACTURING THEREOF

RELATED APPLICATIONS

This application is the U.S. National Phase under 35 U.S.C. §371 of International Application No. PCT/JP2005/003576, filed on Mar. 3, 2005, which in turn claims the benefit of Japanese Application No. 2004-067418, filed on Mar. 10, 2004, the disclosures of which Applications are incorporated by reference herein.

TECHNICAL FIELD

This invention relates to a machine element and a method for manufacture thereof.

BACKGROUND ART

A bearing device for a wheel (HUB) is a machine element for rotatably supporting a tire (wheel) with a vehicle body. Also, a Constant Velocity Joint (CVJ) is a torque transmission unit for transmitting the rotation from an engine to a wheel. The HUB and the Constant Velocity Joint have the following manufacture problems:

(1) A stepped shape requiring a high working ratio is included.

(2) A presence of rolling contact surfaces requires portions with high hardness after high-frequency induction hardening process. For this reason, steel having a high carbon content such as S53C or SAE1050 is used, thereby increasing deformation resistance in the working process.

In view of the above-mentioned situation, cold forging and warm forging are difficult, thereby hot forging is widely used. In the case of hot forging, the forging temperature reaches not lower than 1000° C., and therefore the micro structure after forging is coarsened, and air cooling from the high temperature results in high hardness. Taking machinability and cold plastic workability in a subsequent process into consideration, therefore, heat treatment such as normalizing or annealing (softening heat treatment) is carried out to improve the workability in accordance with the working conditions.

The aforementioned heat treatment to improve the workability, however, requires a great amount of time and energy, hampers an in-line process and deteriorates manufacture efficiency. In view of this, a method for eliminating the softening heat treatment after forging by reducing hardness increase after hot forging by an alloy design of steel (S1) has been disclosed (Japanese Patent Laying-Open No. 06-057324 (patent document 1)). Also, steel has been proposed to improve the machinability and the strength by adjusting a composition, especially by increasing the Si content (S2) (Japanese Patent Laying-Open No. 2002-332535 (Patent Document 2)).

Patent Document 1: Japanese Patent Laying-Open No. 06-057324

Patent Document 2: Japanese Patent Laying-Open No. 2002-332535

DISCLOSURE OF THE INVENTION

Problems to be Solved by the Invention

According to the (S1) method described above, although the softening heat treatment can be eliminated, steel keeps an as-hot-forged state, therefore the micro structure is coarsened and meshed ferrite is generated. As a result, both durability and ductility are reduced. FIG. 21 is a diagram showing a bearing device for a wheel 110 for non-driven wheels. Balls 101 are arranged between a HUB ring 104, an inner ring 102 and an outer ring 103. HUB ring 104 and a tire not shown are coupled to each other by a HUB bolt 111 arranged at a forward end of a flange or an arm of the HUB ring. The repetitive displacement transmitted from the tire generates a large repetitive stress in a root portion 104n of the flange or the arm constituting a connecting portion with the tire. As a result, the coarsened micro structure in the as-hot-forged state is reduced in durability, and may cause a cracking often resulting in a breakage. To handle this inconvenience, the micro structure in the as-hot-forged state is required to be fined and the generation of the meshed ferrite is required to be suppressed.

The high Si content in the aforementioned (S2) method is liable to promote decarburization during the hot forging process and generate a deep decarburized layer in a surface layer portion. As a result, the strength of a non-cut portion in the as-hot-forged state is reduced. Parts comprising the HUB and the Constant Velocity Joint, which have many as-hot-forged and non-cut portions in a form of a completed product, are especially liable to be reduced in strength. Further higher Si content extremely increases the hardness of steel and therefore adversely affects the machinability and plastic workability.

Means for Solving the Problems

An object of this invention is to provide a machine element and a method for manufacture thereof in which a fine structure superior in strength, toughness and ductility of a product in an as-hot-forged state can be obtained without adversely affecting machinability and plastic workability.

The machine element according to this invention includes an outer member, an inner member and rolling elements arranged in a rolling groove formed on each of the outer member and the inner member. At least one part constituting this machine element is formed of steel containing C of 0.45 to 0.70 mass % and at least one of V, Nb and Ti of not more than 0.3 mass % in total, and a micro structure of a portion not subjected to a surface hardening process has ferrite of 15 to 30 area % containing particulate ferrite.

This machine element, due to the high area ratio of ferrite, is softened and cutting and plastic working in a subsequent process can be easily conducted. The rolling groove has a different name for a different devices, and is sometimes called a raceway surface.

C of 0.45 to 0.70 mass %

Sufficient strength cannot be secured by C of less than 0.45 mass %, and therefore not less than 0.45 mass % is required. Especially, sufficiently high hardness of a portion of a hardened surface layer cannot be secured. At more than 0.70 mass %, however, toughness and ductility of a portion other than the hardened surface layer become difficult to be secured.

At least one of V, Nb and Ti of not more than 0.3 mass % in total

V, Nb or Ti forms fine carbo-nitrides in an insoluble state even at a pre-forging heating temperature, and therefore increase in an austenite grain size is suppressed by a pinning effect. The carbo-nitrides precipitate newly in both the forging process and unforced cooling. Especially, carbo-nitrides precipitating during recrystallization after forging are favorable as they disperse finely and uniformly. By unforced cooling after hot forging, the carbo-nitride functions as a ferrite nucleation site, and therefore generation of particulate ferrite is promoted. All of V, Nb and Ti generate a carbide, a nitride and a composite carbo-nitride containing a carbide and a nitride in steel. These substances are not, however, required to be distinguished strictly, and any form of precipitation contributes, though to different degrees, to an effect of the invention. These forms, therefore, are collectively called carbonitride. A carbide is often formed in steel of a high carbon content according to this invention, and even the V, Nb or Ti precipitate containing such carbide as a real material is also called carbo-nitride. Only one of V, Nb and Ti may be contained with an amount of not more than 0.3 mass %.

The particulate ferrite, unlike the meshed ferrite generated along an austenite grain boundary, has an effect of splitting a pearlite and substantially fines a structure. Even in the as-hot-forged state without the normalizing process, therefore, the micro structure is fine and softened by an increased ferrite ratio. Nevertheless, the micro structure may be strengthened by fining structure and dispersion of the aforementioned carbo-nitride. Thus, the micro structure may not be quite softened but strengthened. The cracking, however, is improved by the fined structure. At the ferrite area ratio of not less than 15%, parts of a rolling machine device superior in strength, toughness and ductility can be obtained. At the ferrite area ratio of more than 30%, however, static strength and durability are reduced and a use for the aforementioned parts becomes impossible.

The portion not subjected to the surface hardening process is a portion not subjected to such a process by the high-frequency induction hardening or the like, such as a portion inside a surface layer. In this case, the plastic working such as caulking would cause the structure flow and deformation. Therefore, measurement is required to be conducted for other than the plastically deformed portion.

With at least one of the elements V, Nb and Ti of more than 0.3 mass % in total, required toughness and ductility cannot be easily secured, and therefore the value is required to be not more than 0.3 mass %. In the case where the total is less than 0.01 mass %, however, the ferrite nucleation site cannot be formed with a sufficient dispersion density, and therefore, not less than 0.01 mass % is allowed. Not less than 0.02 mass % is recommended to obtain a more positive effect.

The steel described above, in addition to carbon, V, Nb and Ti, may contain Si and Mn equivalent to the representative steel type designated as a structural steel material (H steel: JIS G4052) with a guaranteed hardenability, and further may contain Ni of not more than 0.25 mass %, Cr of not more than 1.25 mass % and Mo of not more than 0.45 mass %. Especially, Cr of 0.10 to 0.40 mass % can be contained. Cr is effective for improving the hardenability and a tempering softening resistance. If this effect is to be clarified, however, Cr of not less than 0.1 mass % is required. At more than 0.40 mass %, however, the hot forging workability is reduced and the hot forging cost increases. Therefore, Cr of not more than 0.40 mass % is recommended.

The machine element described above includes a HUB bearing and a Constant Velocity Joint.

According to this invention, there is provided a method for manufacturing a machine element including an outer member, an inner member and rolling elements arranged in a rolling groove formed on each of the outer member and the inner member. This manufacture method is used for manufacturing at least one part forming the machine element, and includes the steps of forming the steel containing C of 0.45 to 0.70 mass % and at least one of V, Nb and Ti of not more than 0.3 mass % in total by hot forging and unforced cooling, cutting the steel in the as-hot-forged state, and hardening by high-frequency induction heating of a predetermined portion of the cut part.

By the above-mentioned manufacture method, a fine micro structure can be obtained without normalizing, and sufficient strength, toughness and ductility can be obtained. As a result, satisfactory mechanical performance can be obtained by an inexpensive manufacture method.

EFFECTS OF THE INVENTION

It is possible to provide the machine element and the manufacture method according to this invention in which a fine structure superior in strength, toughness and ductility of the product in as-hot-forged state can be obtained without adversely affecting the machinability and the plastic workability.

DESCRIPTION OF THE REFERENCE SIGNS

1: ball (rolling element), 2: inner ring, 2a: raceway surface, 3: outer ring, 3a: raceway surface, 4: hub ring, 4a: raceway surface, 4b: caulked portion, 4c: non-cut portion, 4h: surface hardened layer, 4n: flange or arm root, 4s: hub ring stepped wall, 10: bearing device for a wheel, 1: hub bolt, 12: bolt, 12a: female screw, 13: shaft groove, 15: knuckle, 21: roller (rolling element), 31: ball of Constant Velocity Joint, 32: inner ring of Constant Velocity Joint, 32a: rolling groove of Constant Velocity Joint, 33: outer ring of Constant Velocity Joint, 33a: rolling groove of Constant Velocity Joint, 33e: shaft portion (spline portion) of Constant Velocity Joint, 34: cage of Constant Velocity Joint, 35: shaft, 50: Constant Velocity Joint.

BEST MODES FOR CARRYING OUT THE INVENTION

Figure 1:
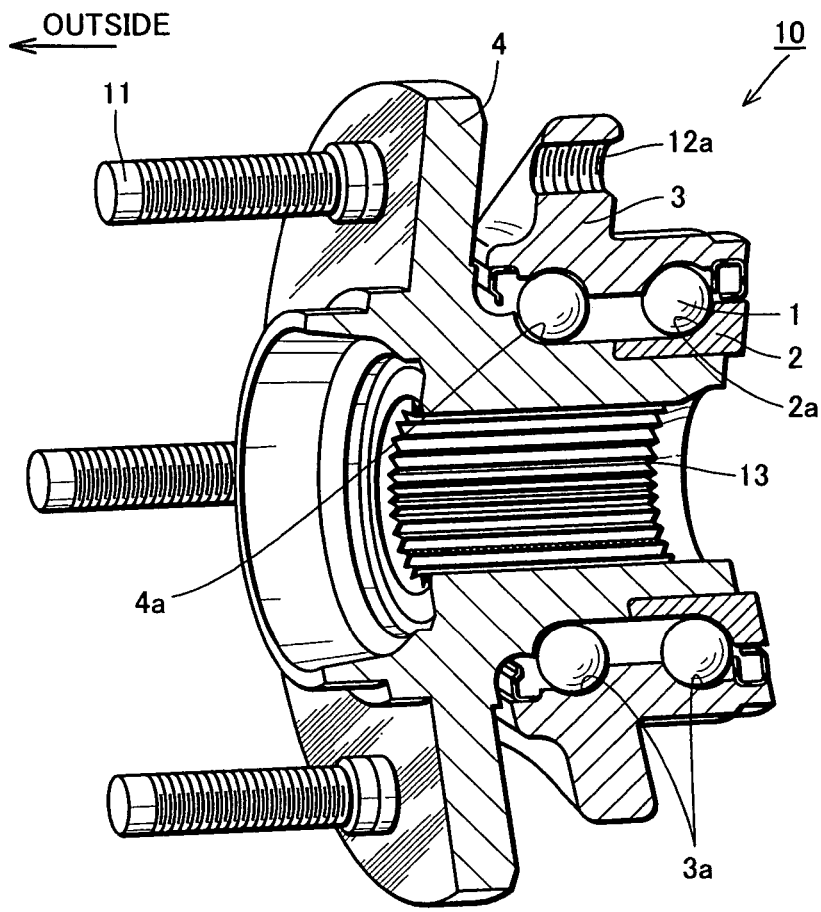
FIG. 1 is a partly cutaway perspective view of a bearing device for a wheel according to the embodiment of the present invention.

Next, embodiments of the present invention are explained with reference to the drawings. In FIG. 1, a bearing device for a wheel 10 is for a driven wheel and a HUB ring 4 formed with shaft grooves 13 fitted with a drive shaft and an inner ring 2 have raceway surfaces 4a, 2a, respectively. At an outside of these, an outer ring 3 is arranged and has a plurality of rows of raceway surfaces 3a in opposed relation to raceway surfaces 4a, 2a, respectively. Balls 1 providing rolling elements are arranged between inner and outer raceway surfaces 4a, 2a, 3a. HUB ring 4 has a HUB bolt 11 arranged on a wheel mounting flange to transmit driving force (load) to a tire not shown. Also, outer ring 3 has a female screw 12a on the flange to be coupled with a knuckle not shown to bear the vehicle load. In the bearing device for a wheel shown in FIG. 1, inner ring 2, after balls are mounted thereon, is subjected to force to the outward direction by a nut on a screw arranged in the HUB ring and fixedly pressed against a stepped wall of the HUB ring. The inner ring may be fixed in this way by a caulking process for caulking the HUB ring to the inner ring. Among the parts of the bearing device for a wheel described above, HUB ring 4 and outer ring 3 are formed of the forementioned particulate ferrite generating steel material (such as C, Si, Mn corresponding to S53C). The inner ring is formed of, for example, JIS SUJ2.

In the structure shown in FIG. 1, a hole for HUB bolt 11 is formed in the flange. To reduce weight, a structure may be employed in which the flange is replaced by the arm for each HUB bolt. In the case where the flange and the arm cannot be easily distinguished from each other in a sectional view, the above-mentioned portion where the cracking is liable to occur is expressed as "the root of the flange or the arm".

Figure 2:
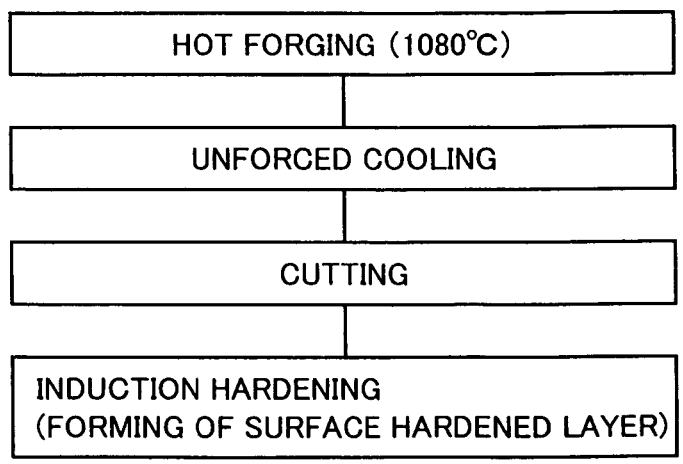
FIG. 2 is a diagram showing a method for manufacturing a part of a machine element according to the embodiment of the present invention.

Next, with reference to FIG. 2, a method for manufacturing a part of a machine element according to an embodiment of the present invention is explained. Steel material (hereinafter referred to as "the particulate ferrite generating steel material") containing C of 0.45 to 0.70 mass % and at least one of V, Nb and Ti of not more than 0.3 mass % in total is hot forged after being heated to a heating temperature for the hot forging of, say, about 1080° C. and is left to cool. In this stage, the approximate shape of the part is formed. After that, a portion requiring dimensional accuracy and finish surface accuracy (roughness, etc.) is precisely finished by the cutting process. After that, a predetermined portion of the surface subjected to the cutting process is hardened by the high-frequency induction hardening process.

In the above-mentioned cutting process, the non-cut portion can be left without being cut. The portion cut in this method can be limited to the portion required for finish accuracy, and the other portion can be left without being cut. As a result, the cost of the cutting process can be reduced.

Also, after the high-frequency induction hardening process, a process of mounting the rolling elements in the machine element and fixing a predetermined member on the machine element in such a manner as to form a space for the rolling element to roll can be provided. Also, the process of fixing the predetermined member on the machine element can be executed by the plastic working such as caulking of a predetermined portion of steel.

Figure 3:
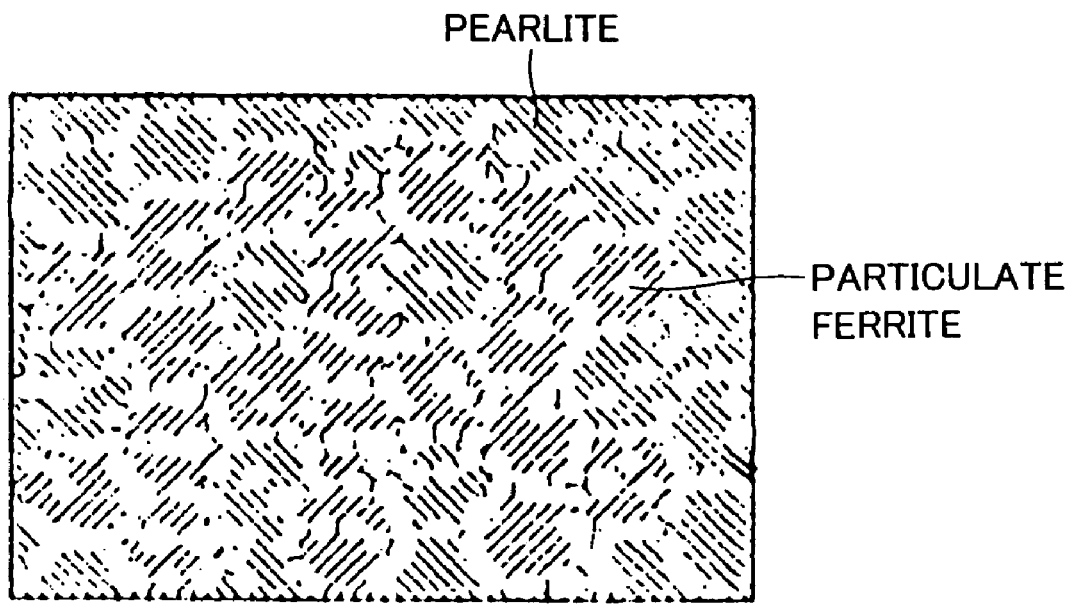
FIG. 3 is a schematic diagram showing a micro structure of a steel obtained by hot forging and unforced cooling a steel according to the embodiment of the present invention.

Next, with reference to FIG. 3, the micro structure obtained by hot forging the above-mentioned steel and cooling it unforcedly is explained. In the steel containing at least one of V, Nb and Ti, the insoluble carbo-nitrides exist at the time of heating to not lower than 1000° C. before hot forging. The carbo-nitrides have the pinning effect against the movement of the austenite grain boundaries thereby to suppress the coarsening of the austenite grains. Also, the fine carbo-nitrides precipitate and form resistance to the growth of the austenite grains at the time of recrystallization of the hot working structure during temperature decrease. After hot forging, during the process of unforced cooling, ferrite transformation is generated from the austenite during the temperature decrease, followed by generation of pearlite transformation. In the process, as a phenomenon unique to the particulate ferrite generating steel material described above, the ferrite transformation is promoted so that the area ratio of ferrite is increased while at the same time the particulate ferrite is generated at a high ratio. As a result, the pearlite particles are substantially segmented by ferrite and fined. The particulate ferrite is promoted as described above because the carbo-nitrides of V, Nb or Ti are generated during the recrystallization in the hot forging process or the subsequent process of unforced cooling and the ferrite transformation occurs with the carbo-nitrides as nucleation sites. These carbo-nitrides and the like precipitate both at boundaries and interior of the austenite grains, and therefore the particulate ferrite is generated both at boundaries and interior of the grains. In FIG. 3, some ferrite is generated along the grain boundaries without the core of the carbo-nitride.

The particulate ferrite can be judged from a shape thereof. The ferrite located in the grains is the particulate ferrite. The particulate ferrite may be generated at the grain boundaries. The meshed ferrite is generated along the grain boundaries in a form of a band rather than the particle. The area ratio of ferrite can be measured by using a commercially available area ratio automatic measuring instrument due to ease with which ferrite and pearlite can be discriminated from each other in the micro structure. The ferrite area ratio can be measured also by determining and averaging a proportion of the portion of an arbitrary straight line existing in the ferrite within a visual field of an optical microscope.

Figure 4:
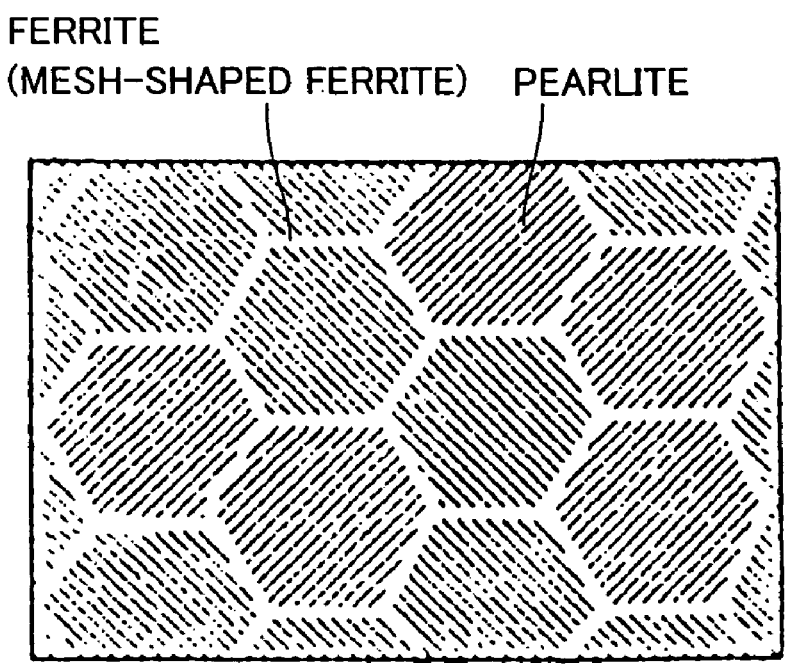
FIG. 4 is a schematic diagram showing a micro structure obtained by hot forging and unforced cooling carbon steel for machine structural use; S53C.

A schematic diagram of a micro structure obtained with a carbon steel not containing V, Nb or Ti subjected to the process of hot forging and unforced cooling is shown in FIG. 4. According to FIG. 4, ferrite is generated in the meshed form at the austenite grain boundary during the process of unforced cooling, after which the austenite is transformed to pearlite. The pearlite, therefore, is more coarse than shown in FIG. 3. Also, in view of the fact that the ferrite transformation is not promoted, the ferrite area ratio is smaller than the ratio of the micro structure shown in FIG. 3.

Figure 5:
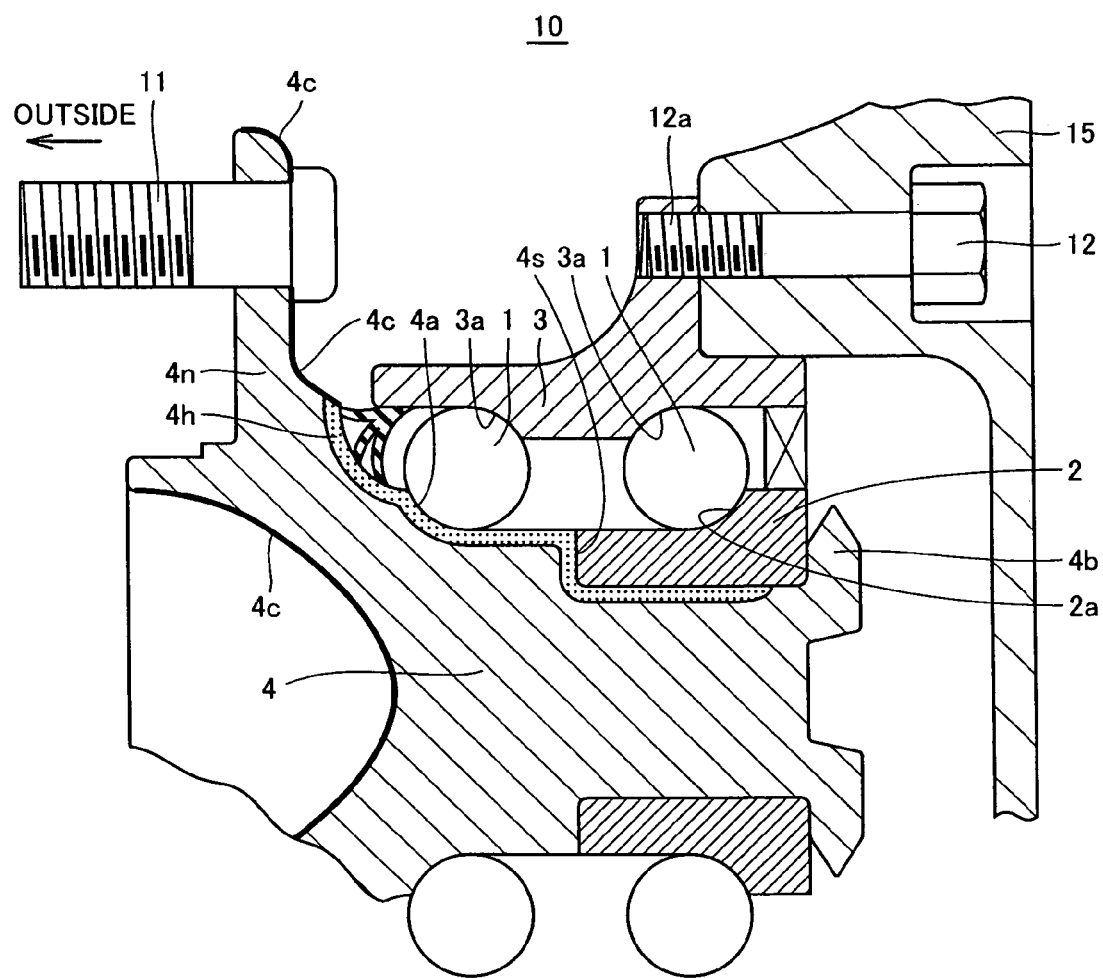
FIG. 5 is a diagram showing another bearing device for a wheel according to the embodiment of the present invention.

FIG. 5 shows a bearing device for a wheel 10 for a non-driven wheel according to another embodiment of the invention, in which the inner ring is fixed by caulking the HUB ring, and the HUB ring has the non-cut portion unlike the bearing device for a wheel shown in FIG. 1. Outer ring 3 is coupled to knuckle 15 with bolt 12 screwed to female screw 12a. Two rows of balls 1 are arranged between a plurality of rows of raceway surfaces 3a of outer ring 3, and raceway surface 2a of inner ring 2 and raceway surface 4a of HUB ring 4. High load is imposed on the raceway surfaces from balls 1, and therefore the surface hardened layer is formed by high-frequency induction hardening, etc. In FIG. 5, although only surface hardened layer 4h formed by the high-frequency induction hardening process on the surface layer including the raceway surface of HUB ring 4 is shown, the surface hardened layer is formed, though not shown, also on outer ring 3 and inner ring 2 as well as HUB ring 4.

In FIG. 5, surface 4c in the neighborhood of the hole of HUB bolt 11 and surface 4c at an outer central portion of HUB ring 4 constitute non-cut surfaces. For these surfaces, a surface characteristic and the dimensional accuracy are not so important, and therefore the manufacture cost is reduced by the non-cut finishing process.

As described above, inner ring 2 is caulked by caulked portion 4b of the HUB ring, and fixedly pressed against stepped wall 4s of the HUB ring. An orbital caulking process is used for caulking. In this orbital caulking process, the coarse micro structure shown in FIG. 3 is liable to generate the cracking while the generation of the cracking can be suppressed in the ferrite pearlite structure including the particulate ferrite shown in FIG. 2. As described above, the grain size number of the ferrite particles in the micro structure of the portion not subjected to the high-frequency induction hardening is as fine as not less than No. 7.

In FIG. 5, HUB ring 4 and outer ring 2 are formed using the particulate ferrite generating steel material. As a result, HUB ring 4 and outer ring 2 are high in ductility and toughness without normalizing. As a result, the caulking process can be executed without generating the cracking. Also, the root 4n of the arm or the flange develops no cracking under a repetitive load in use.

Figure 6:
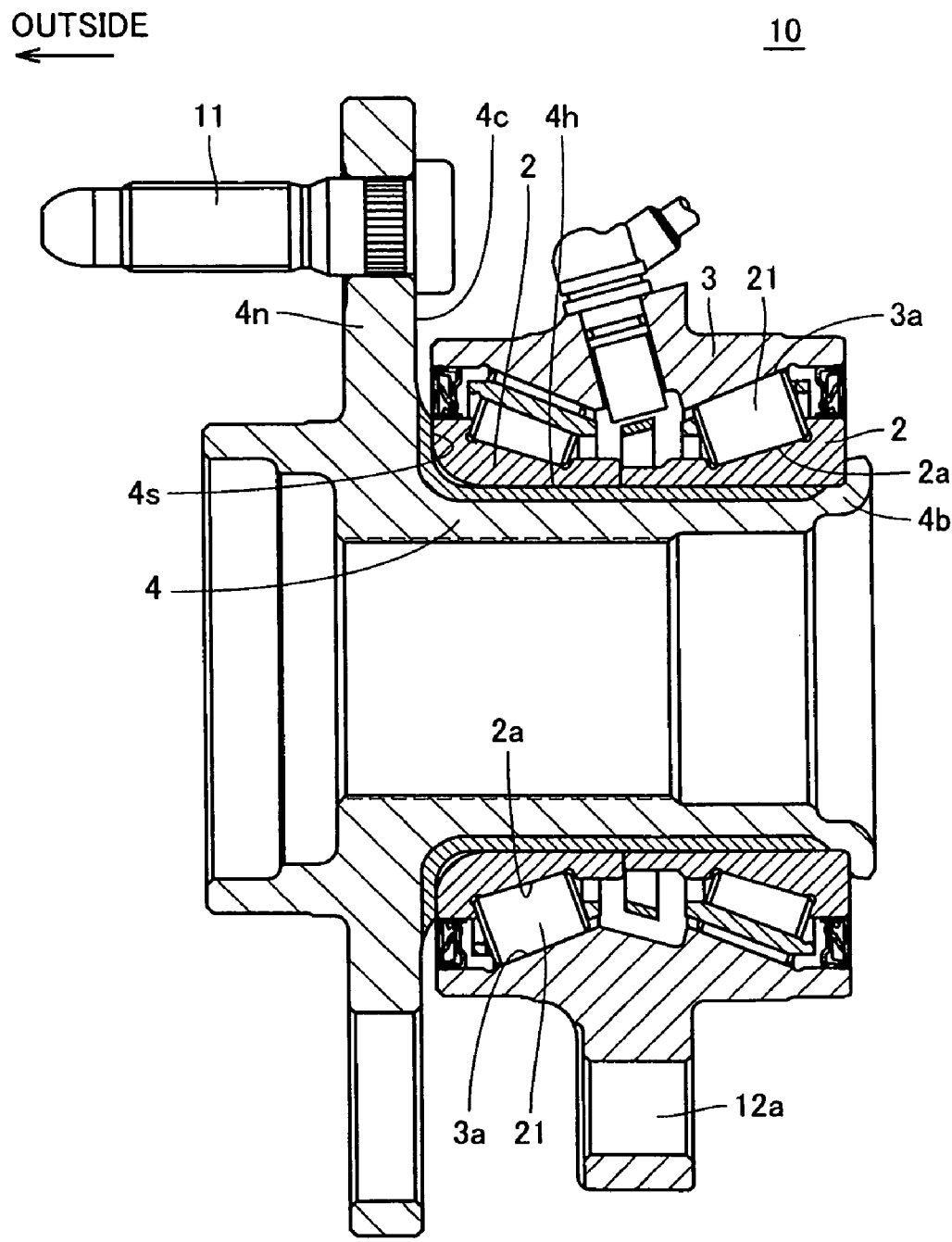
FIG. 6 is a diagram showing still another bearing device for a wheel according to the embodiment of the present invention.

Next, with reference to FIG. 6, a bearing device for a wheel 10 according to another embodiment of the present invention is explained. In the bearing device for a wheel 10 for a driven wheel using a roller 21 as the rolling element, HUB ring 4 has no raceway surface, and raceway surfaces 2a, 3a are formed on outer ring 3 and inner ring 2. Outer ring 3 and HUB ring 4 are manufactured of the particulate ferrite generating steel material while inner ring 2 and roller 21 are manufactured using JIS SUJ2.

Although no raceway surface is formed on HUB ring 4, the surface hardened layer 4h is formed by the high-frequency induction hardening process on the surface in contact with the inner ring to support the load imposed through the inner ring.

Two inner rings 2 are fixedly pressed against stepped wall 4s of HUB ring 4 by caulked portion 4b obtained by caulking HUB ring 4.

Figure 7:
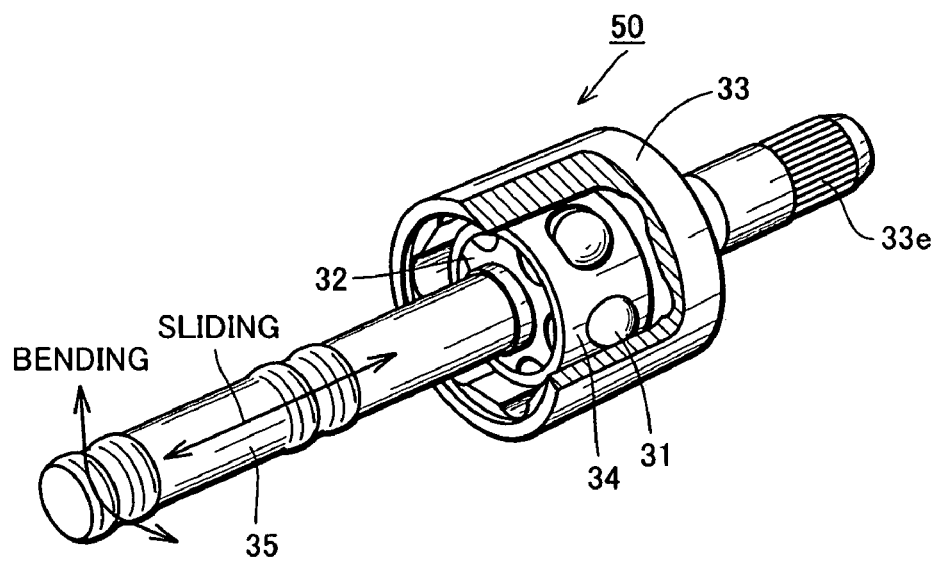
FIG. 7 is a diagram showing a Constant Velocity Joint according to the embodiment of the present invention.
Figure 8:
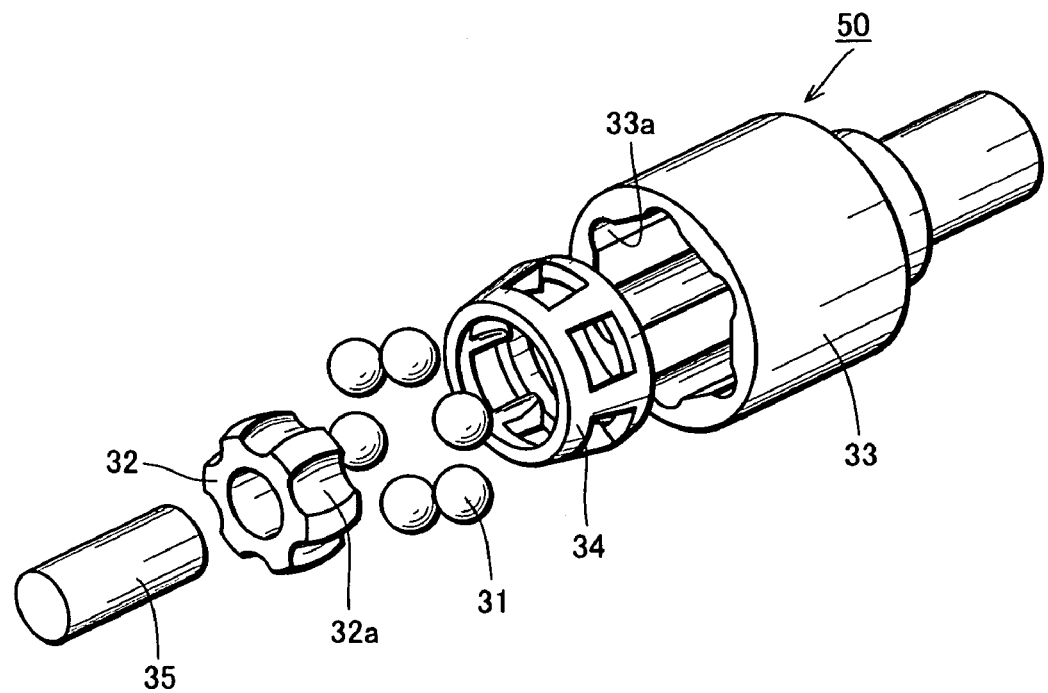
FIG. 8 is an exploded perspective view of FIG. 7.

Next, with reference to FIGS. 7 and 8, a Constant Velocity Joint (CVJ) according to another embodiment of the present invention is explained. In FIG. 7, a Constant Velocity Joint 50 constituting a machine element includes torque transmission balls 31 constituting rolling elements to transmit rotational torque load. Balls 31 are held on cage 34 between an inner ring 32 and an outer ring 33. Inner ring 32 and outer ring 33 are formed with rolling grooves 32a, 33a, respectively, and the surface hardened layer is formed by high-frequency induction hardening, etc. on the surface including the rolling grooves. In Constant Velocity Joint 50, outer ring 33 is manufactured of the particulate ferrite generating steel material.

A main function of Constant Velocity Joint 50 is to transmit the rotational torque with a predetermined degree of freedom. The Constant Velocity Joint is roughly classified into a fixed type which allows angular displacement only between two axes and a sliding type which allows angular and axial displacement. The embodiments shown in FIGS. 7 and 8 represent the sliding type. Shaft 35 has degree of freedom for sliding and bending. As described above, the cracking is generated in the root of the flange or the arm; the center portion near the HUB bolt of the HUB ring. In a similar fashion, a spline portion 33c of the shaft of the Constant Velocity Joint subjected to rolling may be broken under torsional load.

Figure 9:
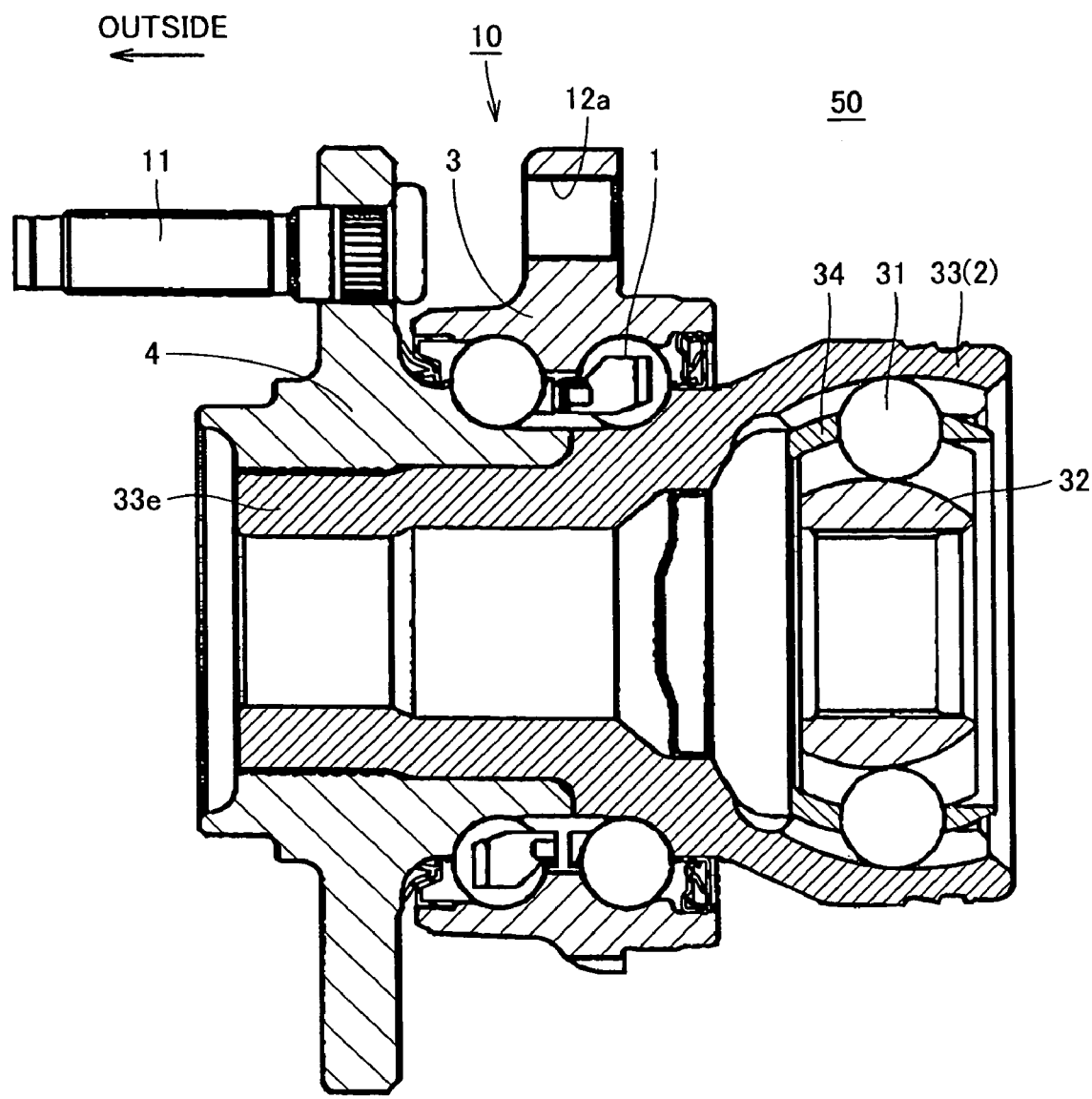
FIG. 9 is a diagram showing a bearing device for a wheel formed by replacing an inner ring with the Constant Velocity Joint according to the embodiment of the present invention.

FIG. 9 shows still another embodiment of the present invention in which Constant Velocity Joint 50 is combined and doubles as inner ring 2 of bearing device for a wheel 10. This structure is known as what is called the fourth-generation wheel bearing. Rotating effort is transmitted from the Constant Velocity Joint 50 to HUB ring 4 and further to the tire coupled by HUB bolt 11 from HUB ring 4. An end portion of shaft 33e of outer ring 33 of Constant Velocity Joint 50 is fixed on the HUB ring by diameter-enlarging caulking. In this combination, HUB ring 4, outer ring 3 and outer ring 33 of Constant Velocity Joint 50 doubling as inner ring 2 of bearing device for a wheel 10 are manufactured of the aforementioned particulate ferrite generating steel material.

First Example

Next, a result of the investigation made into mechanical properties and the micro structure after hot forging is actually executed is explained. Table 1 shows a composition of the steel material used in the first example of the invention. Each steel according to an example of the invention is improved based on S53C. The feature of the composition is as follows. Specifically, in examples 3 and 4 of the invention, V or the like is contained with a low Mn content.

(Example 1 of the invention) S53C equivalent plus V of 0.08 mass %

(Example 2 of the invention) S53C equivalent plus Ti of 0.07 mass %

(Example 3 of the invention) low Mn (0.25 mass %) plus V of 0.09 mass %

(Example 4 of the invention) low Mn (0.24 mass %) plus V of 0.04 mass % and Ti of 0.06 mass %

(Comparative Examples 1 to 3) S53C

TABLE 1

| Example | Manufacture Method | C | Si | Mn | P | S | Cr | V | Ti |
|---|---|---|---|---|---|---|---|---|---|
| Example 1 of Invention | V Added, as-Hot-Forged at 1020° C. | 0.55 | 0.20 | 0.73 | 0.007 | 0.016 | 0.19 | 0.08 | — |
| Example 2 of | Ti Added, as-Hot-Forged | 0.55 | 0.21 | 0.73 | 0.008 | 0.016 | 0.19 | — | 0.07 |

TABLE 1-continued

| Example | Manufacture Method | C | Si | Mn | P | S | Cr | V | Ti |
|---|---|---|---|---|---|---|---|---|---|
| Invention Example 3 of Invention | at 1020° C. (Developed Steel 1) as-Hot-Forged at 1020° C. | 0.55 | 0.28 | 0.25 | 0.005 | 0.017 | 0.22 | 0.09 | — |
| Example 4 of Invention | (Developed Steel 2) as-Hot-Forged at 1020° C. | 0.56 | 0.24 | 0.24 | 0.006 | 0.016 | 0.21 | 0.04 | 0.06 |
| Comparative Example 1 | as-Hot-Forged at 1020° C. (conventional material 1) | 0.53 | 0.22 | 0.75 | 0.008 | 0.017 | 0.20 | — | — |
| Comparative Example 2 | Normalizing Added (conventional material 2) | | | | | " | | | |
| Comparative Example 3 | as-Hot-Forged at 950° C. | | | | | " | | | |

Figure 12:
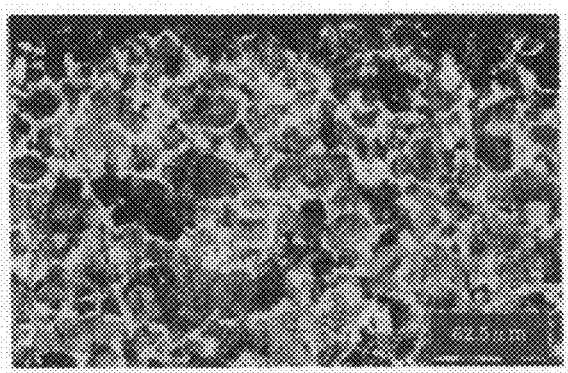
FIG. 12 is a diagram showing a micro structure of example 3 of the present invention in the first example of the invention.
Figure 13:
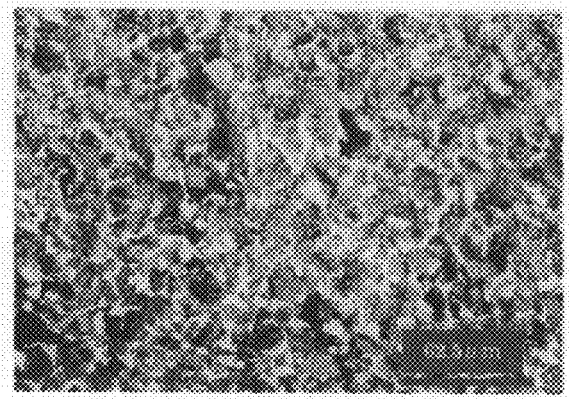
FIG. 13 is a diagram showing a micro structure of example 4 of the present invention in the first example of the invention.
Figure 14:
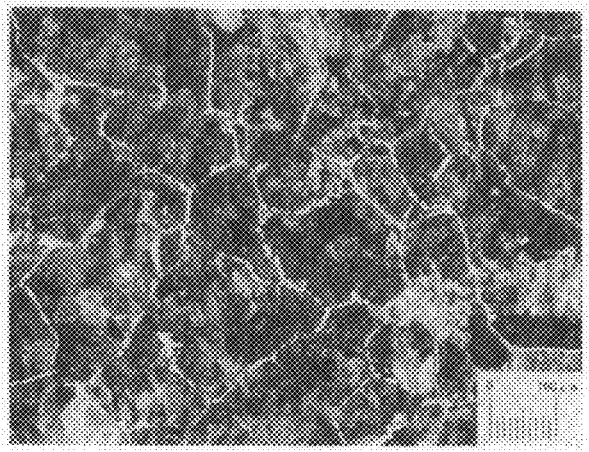
FIG. 14 is a diagram showing a micro structure of comparative example 1 in the first example of the invention.
Figure 15:
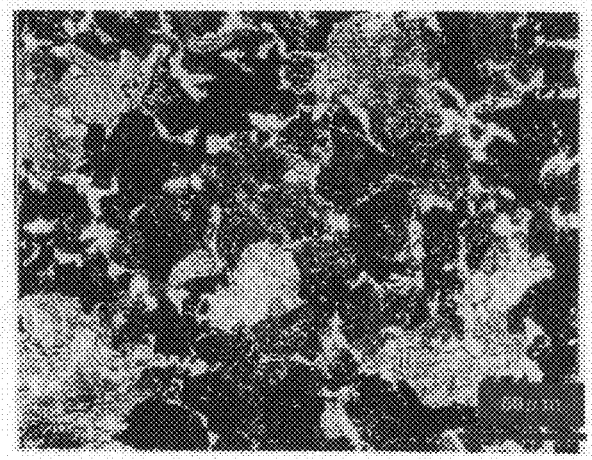
FIG. 15 is a diagram showing a micro structure of comparative example 2 in the first example of the invention.
Figure 16:
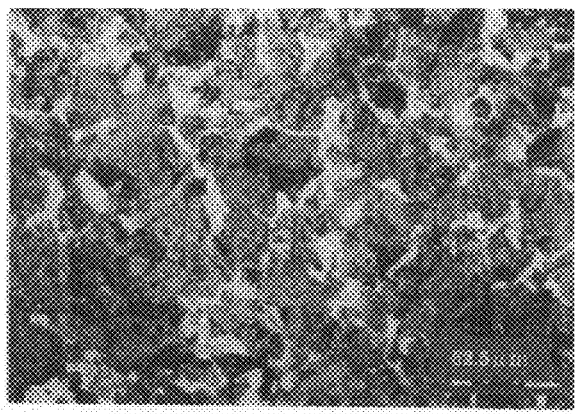
FIG. 16 is a diagram showing a micro structure of comparative example 3 in the first example of the invention.

The micro structure according to the examples of the invention and comparative examples are shown in FIGS. 10 to 16. First, the micro structure of comparative example 1 shown in FIG. 14 is coarse reflecting the as-hot-forged state (note the scale), and substantially all the ferrite can be considered the meshed ferrite generated along the austenite grain boundaries. In the micro structure according to comparative example 2 with the normalizing process added shown in FIG. 15, on the other hand, the particulate (lumped) ferrite is observed in addition to the string-shaped ferrite along the grain boundaries in the structure. Also, comparative example 3 with heating at 950° C. and forging as shown in FIG. 16 has the micro structure equivalent to comparative example 2 with the normalizing process in spite of being in as-hot-forged state.

Figure 11:
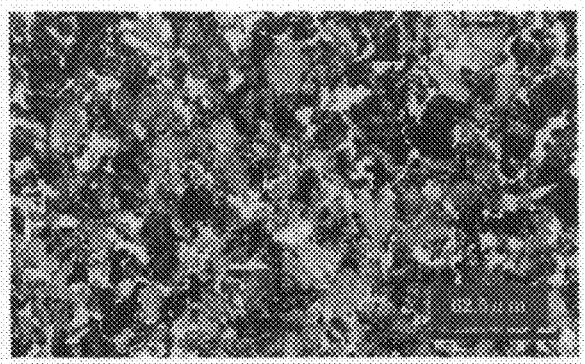
FIG. 11 is a diagram showing a micro structure of example 2 of the present invention in the first example of the invention.

In examples 1 to 4 of the invention shown in FIGS. 10 to 13, on the other hand, the micro structure is very fine, and the particulate ferrite is great in number and high in dispersion density in spite of being in as-hot-forged state. Also, the area ratio of ferrite is increased. Especially, the micro structure according to example 4 of the invention shown in FIG. 13 is fined.

The result of a test conducted on the test pieces described above is shown in table 2. A tensile test was conducted on a test piece cut out of a HUB product.

normalizing process added and comparative example 3 in the as-hot-forged state at 950° C., the ferrite area ratio is not less than 15%. The "particle size" shown in table 2 is that of the austenite of which the approximate contour thereof is plotted with the ferrite. The grain size number is 3.0 in the comparative examples, while it is not less than 6.5 in examples 1 to 4 of the invention, thereby indicating that the micro structure is fined. The measurement of the austenite grain size number can be determined by comparing the micro structure photograph having the austenite grain boundaries noted therein with the grain size reference diagram defined by JIS on an assumption that the austenite grain boundary exists in the meshed ferrite of the micro structure. Specifically, in the case where very narrow meshed ferrite is generated along the austenite grain boundaries, the measurement can be conducted by regarding the meshed ferrite as the austenite grain boundaries. Also, in the case where the ferrite generated along the austenite grain boundaries of the meshed ferrite is comparatively wide, on the other hand, measurement can be conducted by assuming the austenite grain boundary existent within the ferrite width along the ferrite or by actually noting it in the microphotograph. A line indicating the austenite grain boundaries can be easily written in the microphotograph within the width of the meshed ferrite along the same ferrite.

TABLE 2

Figure 10:
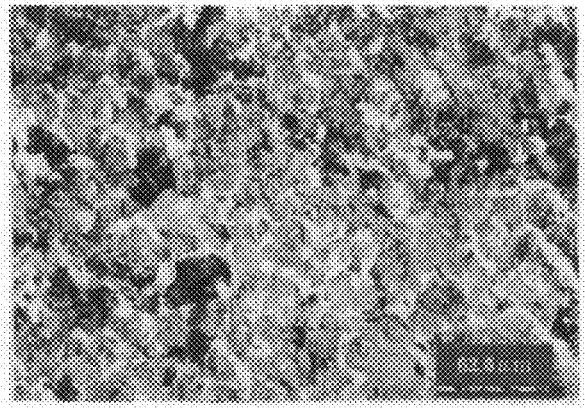
FIG. 10 is a diagram showing a micro structure of example 1 of the present invention in the first example of the invention.

| Example | Specification | Area Ratio (Ferrite) (%) | Grain Size (Grain Size No.) | Hardness Change Rate (%) | Reduction Improvement Ratio (%) | Tensile Strength Improvement (MPa) | Drawing |
|---|---|---|---|---|---|---|---|
| Example 1 of Invention | V Added, as-Forged | 21 | 7.0 | +1 | 14 | 11 | FIG. 10 |
| Example 2 of Invention | Ti Added, as-Forged | 17 | 6.8 | +2 | 12.5 | 13 | FIG. 11 |
| Example 3 of Invention | (Developed Steel 1) as-Forged | 24 | 7.7 | −7 | 20 | 15 | FIG. 12 |
| Example 4 of Invention | (Developed Steel 2) as-Forged | 28 | 8.0 | −6 | 15 | 16 | FIG. 13 |
| Comparative Example 1 | as-Forged (conventional material 1) | 12 | 3.0 | Reference | Reference | Reference | FIG. 14 |
| Comparative Example 2 | Normalizing Added (conventional material 2) | 20 | 7.0 | −7 | 15 | 10 | FIG. 15 |
| Comparative Example 3 | as-Hot-Forged at 950° C. | 22 | 6.5 | −4 | 11 | 9 | FIG. 16 |

Table 2 shows that the ferrite area ratio of comparative example 1 is 12%, while examples 1 to 4 of the invention have the ferrite area ratio of not less than 15% in spite of the same as-hot-forged state. Also in comparative example 2 with the The hardness change rate is an index as to whether the test piece is hardened (+) or softened (−) with reference to comparative example 1. According to examples 1 and 2 of the invention, the hardness change rate is positive in spite of the fact that the ferrite area ratio is increased as compared with the reference probably because the micro structure is substantively fined very much and V or Ti precipitates are dispersed to be dispersion-strengthened. In examples 3 and 4 of the invention, the test piece is softened in spite of the fact that V and/or Ti is contained because Mn is lowered. Especially, comparative example 3 is softened greatly. Reflecting this trend, the reduction of comparative example 3 is conspicuously increased. As for the remaining comparative examples 1, 2 and 4, the reduction characteristic equivalent to comparative example 2 with the normalizing process added can be obtained.

In all the examples of the invention, improvement in tensile strength is at least equivalent to that of comparative example 2 with normalizing. Especially, improvement in examples 3 and 4 of the invention is conspicuous.

The reduction obtained by the tensile test is correlated with the deformability and the cracking characteristic in the caulking process, and desirably as great as possible. Also, the tensile strength and the reduction correspond to the bending strength characteristic of the product.

From the first example described above, it was confirmed that in examples 1 to 4 of the invention, the strength, workability and bending strength at least equivalent to those of comparative example 2 with the normalizing process added can be obtained in spite of the as-hot-forged state. It was also found that the strength and the workability are higher than comparative examples 3 and 4 with the normalizing process added.

Second Example

Effect of the Si concentration on the surface decarburization of steel was studied. Steel corresponding to S53C containing Si of 0.22 mass % and steel having a higher Si content of 0.50 mass % with the other composition equivalent to that of steel corresponding to S53C were hot forged. After the hot forging process, the micro structure was investigated to examine surface decarburization.

Figure 17:
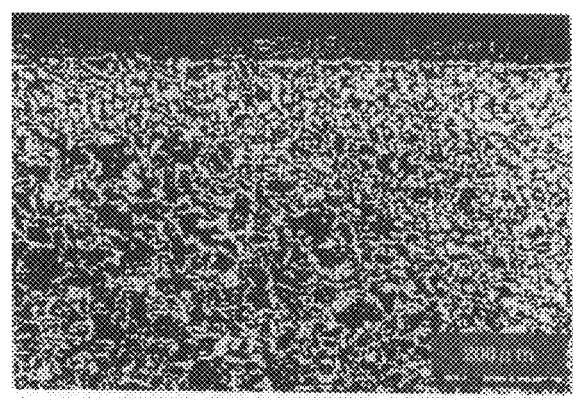
FIG. 17 is a diagram showing the neighborhood of the surface of steel equivalent to S53C (Si content is low) in the second example of the invention.
Figure 18:
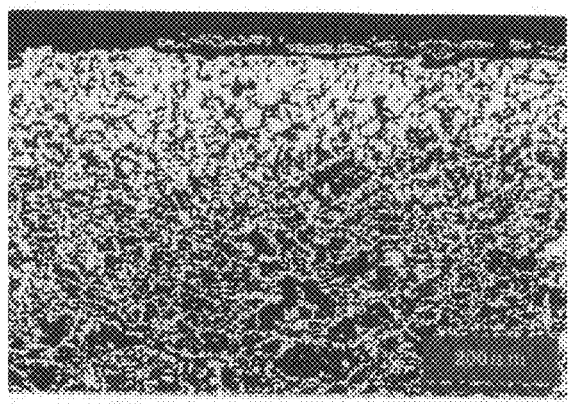
FIG. 18 is a diagram showing the neighborhood of the surface of steel equivalent to S53C (Si content is high; 0.5%) in the second example of the invention.

As understood from FIGS. 17, 18, the surface decarburization is promoted in the steel containing Si of 0.5 mass %. In the widest range of this invention, steel containing Si of 0.5 mass % is also included. To suppress the surface decarburization, however, Si may be lower than 0.5 mass %.

Third Example

Next, endurance test was conducted on the steel used in the manufacture of the HUB ring or the outer ring of the bearing device for a wheel described above. This test can be considered to verify a life against the repetitive stress imposed on the root of the flange or the arm at a position nearer to the center from the HUB bolt hole of the HUB ring. The steel used in the examples of this invention contains C of 0.6 mass %, Si of 0.57 mass %, Mn of 0.8 mass %, P of 0.015 mass %, S of 0.017 mass %, Cr of 0.25 mass % and V of 0.15 mass %. The steel used in the comparative examples, on the other hand, is the commercially available carbon steel for machine structural use; S53C defined in JIS G4051.

The steel materials according to the example of the invention and the comparative example were hot forged and cooled unforcedly as shown in FIG. 1, to produce test pieces. No sample was normalized.

As to the test, the caulking workability was evaluated by reduction in the tensile test defined in JIS Z2241 on the one hand, and based on the rotating bending fatigue test defined in JIS Z2274, durability against the repetitive stress imposed on the HUB ring was evaluated on the other hand. A round rod having a horizontal portion 15 mm long and 5 mm in diameter was used as a test piece for the tensile test, and No. 1 test piece (JIS Z2274) was used for the rotating bending fatigue test.

Figure 19:
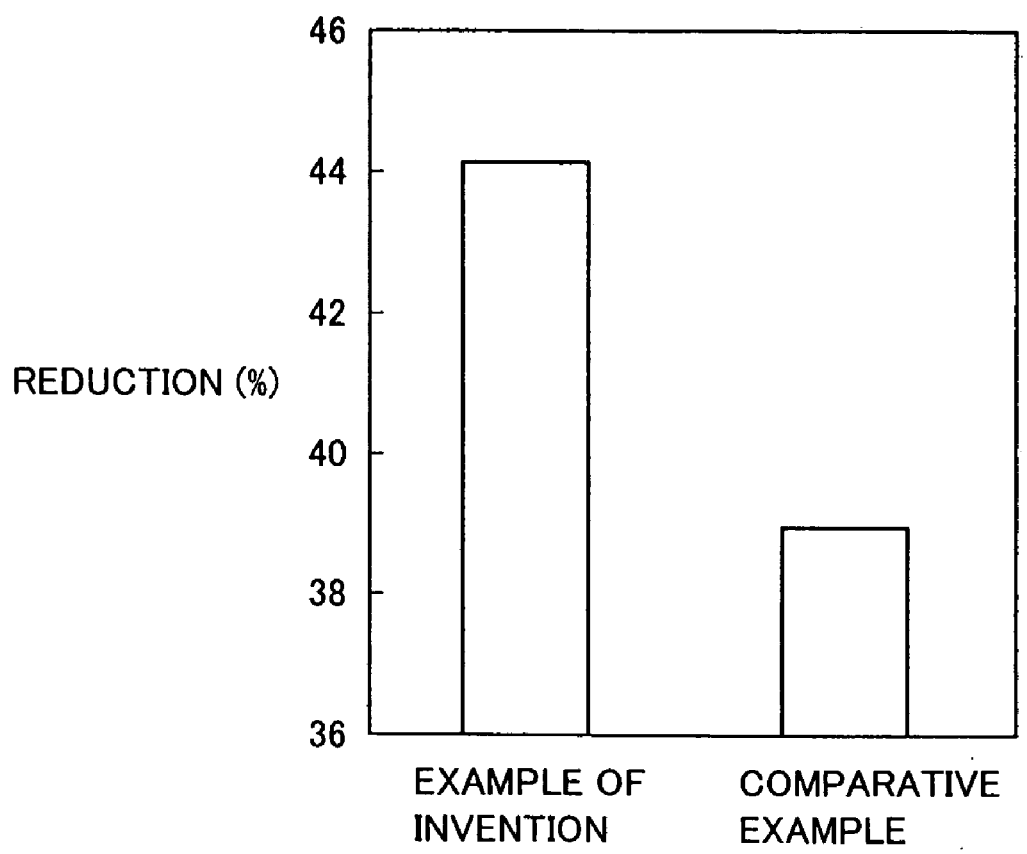
FIG. 19 is a diagram showing reduction in a tensile test conducted in the third example of the invention.
Figure 20:
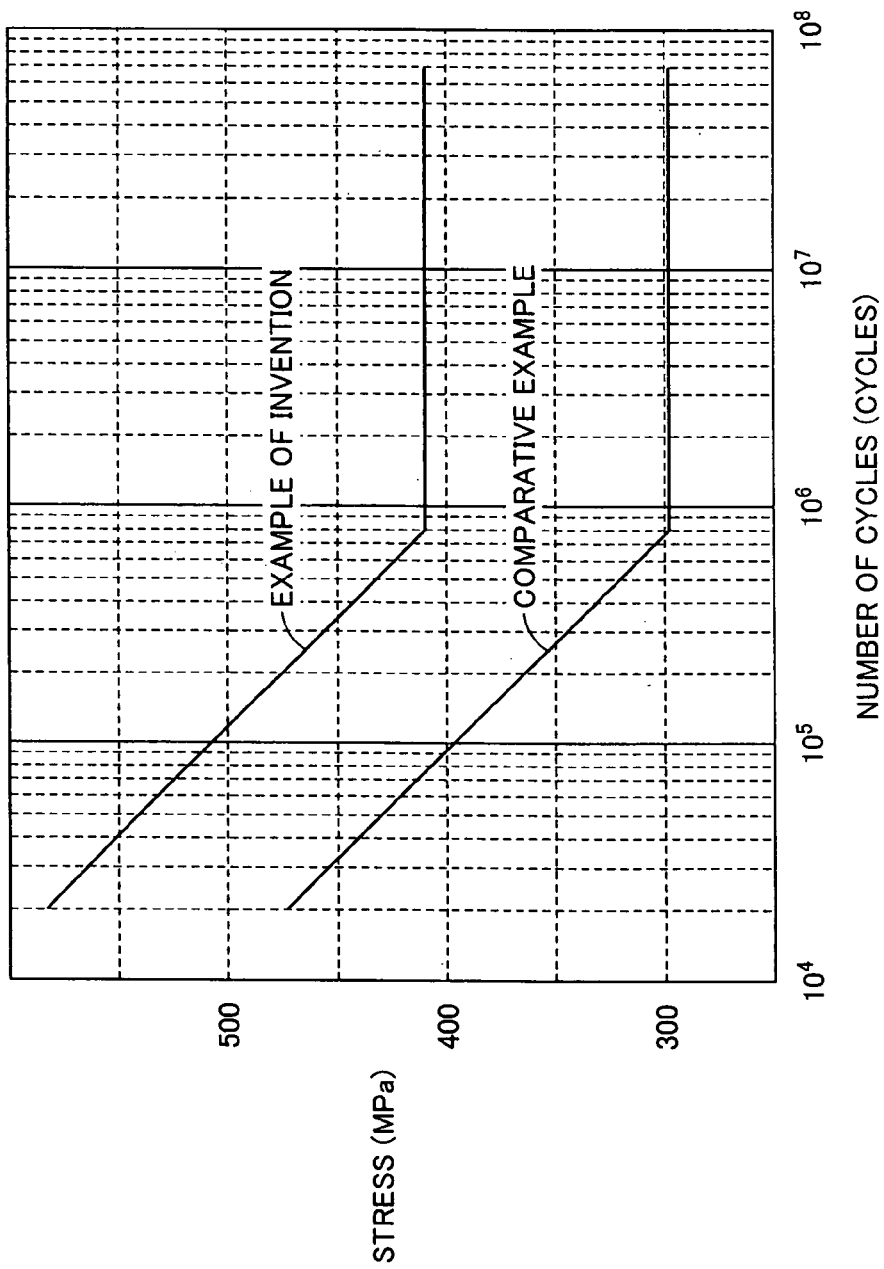
FIG. 20 is a diagram showing a result of a rotating bending fatigue test conducted in the third example of the invention.
Figure 21:
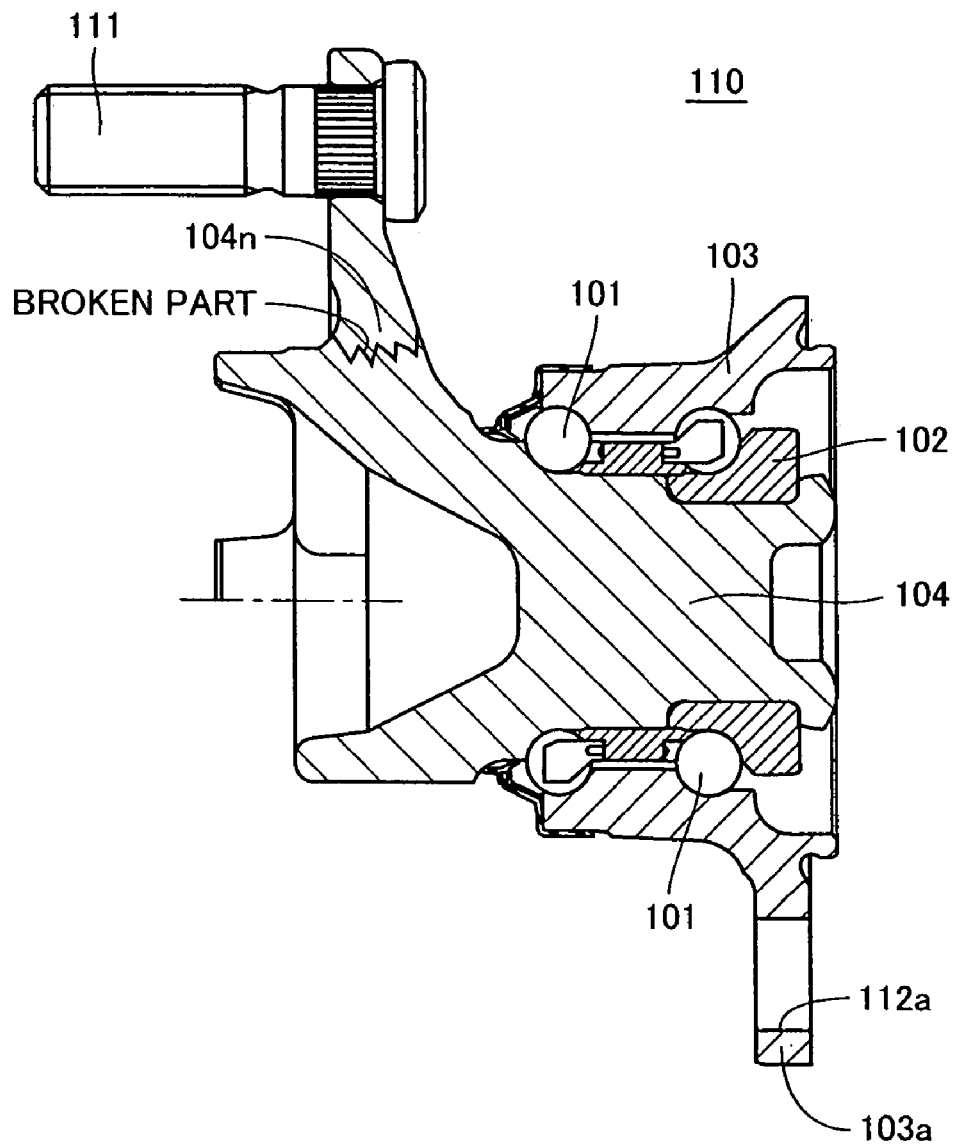
FIG. 21 is a diagram showing one of the problems of a conventional bearing device for a wheel.

A result of reduction in the tensile test is shown in FIG. 19, and a result of the rotating bending fatigue test is shown in FIG. 20. The reduction in the comparative example was 39%, while the reduction in the examples of the invention was improved greatly to 44%. The reduction and the caulking workability are strongly correlated to each other, and the caulking workability is greatly improved by the reduction improvement as much as shown in FIG. 19.

Also, the result of the rotating bending fatigue test in FIG. 20 shows that the rotating bending fatigue strength of the example of the invention is improved about 30% higher than that of the comparative example.

According to the result described above, a machine element having superior performance can be produced at low cost by manufacturing parts of the machine element using steel in the as-hot-forged state without the normalizing process and thus manufacturing and assembling highly durable parts. Also, the HUB ring or the like, among others, can be caulked without developing any crack.

Next, examples of the embodiments of the invention including those embodiments and examples described above are explained below one by one.

In the micro structure described above, the grain size can be set at No. 6 or more.

The grain size described above is the same in meaning as the "grain size" shown in table 2, and the grain size number of the austenite grains of which the approximate contour thereof plotted with the ferrite. By setting the grain size number to 6 or more, superior mechanical properties can be obtained.

The steel described above (particulate ferrite generating steel material) can contain Si of 0.15 to 0.7 mass %, Mn of 0.1 to 0.5 mass % and V of 0.04 to 0.15 mass %.

With this configuration, the decarburization depth in the hot forging process is suppressed and the V carbo-nitrides act to promote generation of ferrite, thereby making it possible to obtain a structure containing the particulate ferrite. As a result, the micro structure can be substantially fined.

Si of 0.15 to 0.7 mass %

With Si of less than 0.15 mass %, the hardenability is so low that a sufficient strength cannot be secured. With Si of more than 0.7 mass %, on the other hand, the decarburization is promoted and the deep decarburized layer is formed in the hot forging process. Therefore, Si is set to not more than 0.7 mass %. To further suppress the decarburized layer, Si is can be set to not more than 0.5 mass %. Further, to avoid the decarburized layer, Si should be set to not more than 0.4 mass %.

Mn of 0.1 to 0.5 mass %

With Mn of less than 0.1 mass %, sulfur (S) in the steel cannot be fixed as MnS, and thereby a cracking is liable to occur during the hot forging process. Therefore, Mn is set to not less than 0.1 mass %. Mn improves the hardenability and is contained as solid solution in steel to increase toughness, while at the same time increasing the retained austenite contributing to the rolling contact fatigue life. However, Mn is contained as solid solution also in the carbide and acts to increase the hardness of the carbide, thereby effectively working to increase the hardness of steel. To attain a higher toughness, Mn of not less than 0.25 mass % should be contained. With Mn of more than 0.5 mass %, however, generation of ferrite is suppressed during unforced cooling after the hot forging process, and a hardened structure is liable to occur. This hampers the cutting and caulking workability, and therefore, Mn can be set to not more than 0.5 mass %.

V of 0.04 to 0.15 mass %

The V carbides, the V nitrides or the V carbo-nitrides, though contained substantially as solid solution in the austenite by being heated before the hot forging process, precipitate during unforced cooling after the hot forging process and function as the ferrite nucleation sites. These V precipitates precipitate on the inclusions, etc. in the austenite grains, and ferrite is further generated with the V precipitates as the nucleus. Specifically, generation of the particulate ferrite is promoted, resulting in an increased ferrite area ratio. This function can be obtained by V of not less than 0.04 mass %. To secure this function more positively, V of 0.06 mass % is desirably contained. Also, in view of the fact that the aforementioned effect is saturated by V of more than 0.15 mass %, V should be set to not more than 0.15 mass %.

Incidentally, as to the impurity elements, P is desirably set to not more than 0.030 mass % and S to not more than 0.035 mass %. The impurity elements P and S deteriorate the mechanical properties of steel and therefore should be as low in content as possible for application as steel for bearings. A sophisticated refining equipment and sufficient refining time are required, however, to reduce P and S contents greatly. The power cost for operation of the refining equipment and the cost of the refining reaction materials are increased, however, resulting in a considerably increased overall cost. Therefore, the upper limit of P and S can be a level meeting the cleanliness restrictions (JIS G4051) adapted to allow the deterioration of the mechanical properties as the bearing material.

Among the raceway surfaces (rolling grooves) of the outer member and the inner member constituting the machine element, the grain size number of the austenite grains of the surface hardened layer on at least one raceway surface can be set to No. 7 to 11.

The above-mentioned configuration can produce a highly durable surface hardened layer and lengthens the rolling contact fatigue life.

At least one part of the machine element can have a non-cut portion without cutting.

The cutting process for the portion not requiring the cutting for the reason of precision can be omitted to suppress the manufacture cost. In this case, it is important to suppress the decarburized layer with black scale, and the fatigue cracking can be suppressed. For this purpose, the Si content should be set rather low.

Also, in the above-mentioned machine element, the inner member can include a first inner member and a second inner member, one of which has the micro structure containing the above-mentioned ferrite, and one part can be caulked to caulk the other part.

This configuration makes it possible to mount the rolling elements inside before completion of the machine element, and the machine element can be assembled as a unit by caulking the part including the ferrite thereby to caulk a predetermined part.

The embodiments disclosed above should be interpreted as illustrative but not limitative in all senses of the words. The scope of the invention is defined not by the foregoing description but by the appended claims, and intended to include all the modifications without departing from the spirit and scope of the claims.

INDUSTRIAL APPLICABILITY

By using the machine element and the method for manufacture thereof according to this invention, the parts high in durability and workability can be manufactured inexpensively. Since these parts are assembled, the machine element high in reliability is provided at low cost. As a result, applications of the invention are expected to widely cover the machine elements of transportation machines and equipment including automobiles.

The invention claimed is:

1. A machine element comprising an outer member, an inner member and rolling elements arranged in rolling grooves formed on said outer member and said inner member, respectively, wherein
    at least one of parts constituting said machine element is formed of steel containing C of 0.45 to 0.70 mass %, Si of not less than 0.15 mass % and not more than 0.4 mass %, Mn of 0.1 mass % to 0.25 mass %, and at least one of V, Nb and Ti of not more than 0.3 mass % in total, and ferrite in a micro structure of a portion not subjected to surface hardening process has an area ratio of 15 to 30% and contains particulate ferrite.

2. The machine element according to claim 1, wherein a grain size in the micro structure of said portion not subjected to the surface hardening process is not less than No. 6.

3. The machine element according to claim 1, wherein said steel contains V of 0.04 to 0.15 mass %.

4. The machine element according to claim 1, wherein a grain size number of austenite grains of a surface hardened layer in at least one rolling groove among said rolling grooves of the outer member and the inner member constituting said machine element is No. 7 to 11.

5. The machine element according to claim 1, wherein at least one of the parts constituting said machine element includes a non-cut portion not cut after a hot forging process.

6. The machine element according to claim 1, wherein the inner member in said machine element has a first inner member and a second inner member, one of which has said micro structure containing the ferrite, and the particular part is caulked thereby to caulk the other part.

7. A method for manufacturing a machine element comprising an outer member, an inner member and rolling elements arranged in rolling grooves formed on said outer member and said inner member, respectively, wherein
    in a manufacture of at least one part forming said machine element comprises the steps of:
    forming steel containing C of 0.45 to 0.70 mass %, Si of not less than 0.15 mass % and not more than 0.4 mass %, Mn of 0.1 mass % to 0.25 mass %, and at least one of V, Nb and Ti of not more than 0.3 mass % in total by hot forging and cooling unforcedly;
    cutting said steel in as-hot-forged state; and
    subjecting a predetermined portion of the cut part to high-frequency induction heat hardening.

* * * * *